United States Patent [19]

Batzill et al.

[11] Patent Number: 4,661,541
[45] Date of Patent: Apr. 28, 1987

[54] ALCOHOL-MODIFIED POLYEPOXIDES, THEIR PREPARATION AND THEIR USE IN CURABLE MIXTURES

[75] Inventors: Wolfgang Batzill; Arnold Dobbelstein; Michael Geist, all of Münster; Georg Schön, Everswinkel; Günther Ott, Münster-Wolbeck, all of Fed. Rep. of Germany

[73] Assignee: BASF Farben & Fasern AG, Hamburg, Fed. Rep. of Germany

[21] Appl. No.: 711,997

[22] Filed: Mar. 14, 1985

[30] Foreign Application Priority Data

Mar. 14, 1984 [DE] Fed. Rep. of Germany ....... 3409188

[51] Int. Cl.$^4$ ..................... C08G 59/42; C08G 59/62
[52] U.S. Cl. ................................... 523/414; 523/415; 523/416; 525/415; 525/408; 528/99; 528/100; 528/110; 528/354; 528/361; 528/365; 156/330
[58] Field of Search ............... 528/110, 104, 361, 354, 528/406, 367, 99, 100; 523/414, 415, 416; 525/408, 415

[56] References Cited

U.S. PATENT DOCUMENTS

| | | | |
|---|---|---|---|
| 2,700,030 | 1/1955 | Widmer et al. | 528/110 X |
| 2,928,810 | 3/1960 | Belanger | 528/406 X |
| 2,947,712 | 8/1960 | Belanger et al. | 528/110 X |
| 3,374,286 | 3/1968 | Hicks | 528/406 X |
| 3,424,817 | 1/1969 | Hicks | 528/110 X |
| 4,495,335 | 1/1985 | Geist et al. | 528/110 X |

*Primary Examiner*—Earl Nielsen
*Attorney, Agent, or Firm*—Kenyon & Kenyon

[57] ABSTRACT

This application discloses a synthetic resin based on alcohol-modified polyepoxides. The synthetic resin can be prepared by reacting a diepoxide, or a mixture of diepoxides, having an epoxide equivalent weight of less than about 500, with compounds with a hydroxyl group, which is reactive towards epoxide groups, in a molar ratio from about 2:1 to about 7:6 at temperatures from about 100° C. to about 180° C. in an organic solvent free of hydroxyl groups. The synthetic resin has terminal epoxide groups and a mean molecular weight from about 400 to about 5000.

28 Claims, No Drawings

ALCOHOL-MODIFIED POLYEPOXIDES, THEIR PREPARATION AND THEIR USE IN CURABLE MIXTURES

The invention relates to novel polyepoxides which are prepared by reacting low-molecular polyepoxides with alcohols, and to their use in curable mixtures or their use as surface-coating resins, in particular as surface-coating resins for water-soluble or water-dispersible resins.

Polyepoxides in the form of polyglycidyl ethers of 2,2-bis-(4-hydroxyphenyl)-propane and derivates thereof have been known for a long time and thoroughly described as, for example, in "Epoxy Resins and Products", M. William Ranney, Noyes data Corporation, New Jersey 1977.

These polyglycidyl ethers have the following general structure

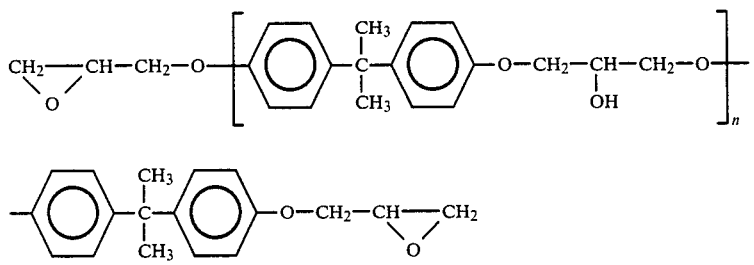

where n=0 to about 12.

In addition, there are polyglycidyl ethers based on bis-(4-hydroxyphenyl)-methane and on bis-(4-hydroxycyclohexyl)-propane. Another form is based on the reaction product of phenol with heptanal (European Patent Application No. 43,612) to give 1,1-bis-(4-hydroxyphenyl)-n-heptane.

Furthermore, polyepoxides are known which are based on polyglycidyl esters, polyglycidyl-hydantoins or diepoxy compounds.

In many fields of application, the attainable properties of the epoxide resins, built up from the structures described above, are not satisfactory. Thus, for example, epoxide resins have a relatively low compatibility with aliphatic hydrocarbons. Another area where the known epoxide resins need to be improved, concerns the elasticity. It is also known that there are problems with the ability of the epoxide resins to be overpainted or adhesively bonded, and with their surface resistivity.

It is the object of this invention to provide novel, improved epoxide resins. The possibility of modifying epoxide resins which, surprisingly, has been found, makes it possible to build up epoxide resins in a controlled manner by the same process for the most diverse purposes.

These novel polyepoxides modified by side chains are the reaction product of low-molecular polyepoxides, in particular bisglycidyl ethers, with low-molecular monohydric alcohols which, if desired, also contain one or more further, sterically strongly hindered hydroxyl groups, so that a linear chain build-up with the epoxide resins is impossible, to give higher-molecular polyepoxides which, if desired, are elasticized in a further reaction step.

The invention therefore relates to a synthetic resin based on alcohol-modified polyepoxides, which is obtainable by reacting (A) a diepoxide, or a mixture of diepoxides, having an epoxide equivalent weight of less than 500, with
(B) compounds with a hydroxyl group, which is reactive towards epoxide groups, in a molar ratio of 2:1 to 7:6, preferably 2:1 to 5:4, and particularly preferably 2:1 to 4:3, at temperatures from 100° to 180° C. in an organic solvent free of hydroxyl groups, in the presence or absence of a tertiary amine as a catalyst, the synthetic resin having terminal epoxide groups and a mean molecular weight from 400 to 5000.

This polyepoxide which has been modified by side chains and, if desired, elasticized by the component (C), can be further reacted with amines for use in aqueous systems.

In the reaction of the polyepoxide (A) with the component (B), the following reaction steps take place.

1st part step: opening of an oxirane ring by the monohydric alcohol to give an intermediate

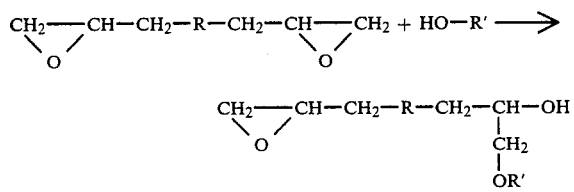

followed by
2nd part step: opening of a further oxirane ring by the hydroxyl group formed in the 1st part step

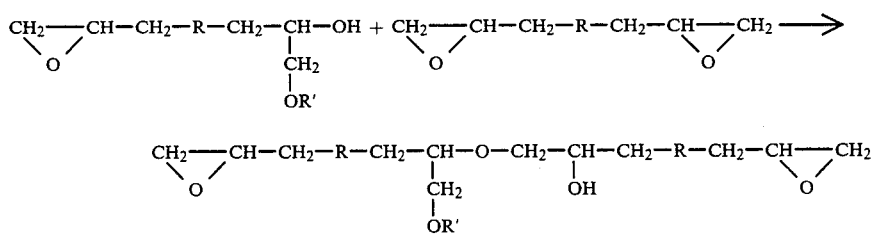

where
R' = organic radicals of the alcohol.
R represents the radicals of the following or similar structures
R = X or —O—X—O—
X = alkylene or cycloalkylene
for example

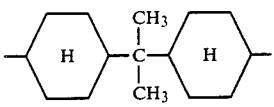

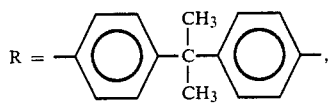

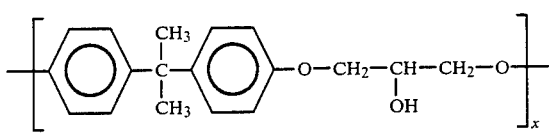

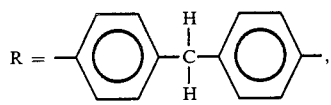

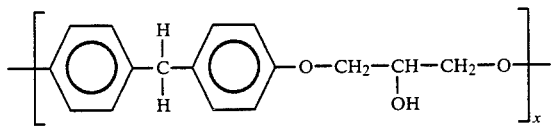

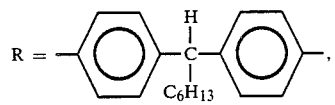

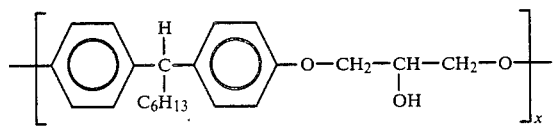

where x ≧ 1

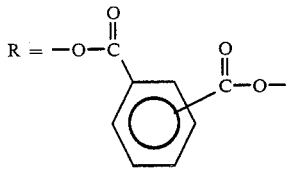

Any monohydric alcohols are in principle suitable for the reaction.

Suitable monohydric alcohols are methanol, ethanol, propanol, isopropanol, butanol, isobutanol, amyl alcohol, isoamyl alcohol, 2-ethylbutanol, 2-ethylhexanol, isononyl alcohol, isodecyl alcohol, isotridecyl alcohol, isohexadecyl alcohol, isooctadecyl alcohol and also neopentyl alcohol, 3,7-dimethyl-octan-3-ol, 3-cyclohexylpropanol and 2,4-dimethylpentan-3-ol.

Unsaturated monohydric alcohols, such as but-1-en-3-ol, 2-methylbut-3-en-2-ol and 3-methylpent-1-en-3-ol, are likewise suitable.

Suitable araliphatic alcohols are benzyl alcohol, 4-methylbenzyl alcohol, phenylethyl alcohol and 2-phenylpropan-1-ol.

Furthermore, cycloaliphatic alcohols, such as cyclohexanol and 4-tertiary-butylcyclohexanol, are suitable.

Suitable hydroxy ethers are the methyl, ethyl and butyl monoethers of ethylene glycol, diethylene glycol, triethylene glycol and polyethylene glycol as well as methoxybutanol, methoxypropanol, phenylglycol, phenyldiglycol, hexylglycol and hexyldiglycol.

In addition, the following alcohols can be used: ethylthioethanol and monoalcoholic prepolymers, for example the reaction product of one of the abovementioned monoalcohols with lactones, such as ε-caprolactone.

All low-molecular polyols which contain only one reactive hydroxyl group and one or more further, sterically strongly hindered hydroxyl groups, so that a linear chain build-up with the epoxide resins is impossible, are also suitable for the reaction.

Typical examples of polyols of this nature are: 2,2,4-trimethylpentane-1,3-diol or similar diols which can be prepared from formaldehyde and suitable ketones with subsequent reduction. Furthermore, 2-methylpropane-1,2-diol and similar diols as well as diols such as 2-methylpent-3-yne-2,5-diol are suitable.

When used in cathodic electrocoatings, these alcohols lead to particularly thick coating films.

The polyfunctional alcohols, polycarboxylic acids, polyamines or polysulfides, suitable as the component C, have a molecular weight from 300 to 3500, preferably from 350 to 1000.

The polyols suitable for the invention include diols, triols and higher polymeric polyols, such as polyester-polyols and polyether-polyols.

Polyalkylene-ether-polyols suitable for component C are of the general formula:

$$H\text{—}[O(CHR)_n]_m\text{—}OH$$

where R = hydrogen or a lower alkyl radical, which may carry various substituents, n = 2 to 6 and m = 3 to 50 or even higher. Poly-(oxytetramethylene)-glycols and poly-(oxyethylene)-glycols are examples.

The preferred polyalkylene-ether-polyols are poly-(oxytetramethylene)-glycols having a molecular weight in the range from 350 to 1000.

The polyester-polyols can also be used as a polymeric polyol component (component C) in the invention. The polyester-polyols can be prepared by poly-esterification of organic polycarboxylic acids or their anhydrides with organic polyols which contain primary hydroxyl groups. Usually, the polycarboxylic acids and the polyols are aliphatic or aromatic dicarboxylic acids and diols.

The diols used for the preparation of the polyesters include alkylene glycols, such as ethylene glycol, butylene glycol and neopentyl glycol, and other glycols such as cyclohexanedimethanol.

The acid component of the polyester consists especially of low-molecular carboxylic acids, or their anhydrides, of 2 to 18 carbons in the molecule. Examples of suitable acids are phthalic acid, isophthalic acid, terephthalic acid, tetrahydrophthalic acid, hexahydrophthalic acid, adipic acid, azelaic acid, sebacic acid, maleic acid and glutaric acid. In place of these acids, their anhydrides can also be used, provided that these exist.

Moreover, polyester-polyols derived from lactones can be used as the component (C) in the invention. These products are obtained by reacting ε-caprolactone with a polyol. Such products are described in U.S. Pat. No. 3,169,945.

The polylactone-polyols obtained by this reaction are distinguished by the presence of a terminal hydroxyl group and by recurring polyester moieties derived from the lactone. These recurring molecule moieties can be of the formula

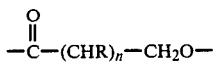

where n is at least 4, preferably 4 to 6, and the substituent is hydrogen, alkyl, cycloalkyl or alkoxy.

In a further advantageous embodiment of the invention, long-chain dicarboxylic acids are used. Examples of these are dimeric fatty acids, such as dimeric linoleic acid.

Suitable polyamines for elasticization can be prepared, for example, by reaction of primary diamines and monoepoxides. The secondary, substituted diamines formed modify the epoxide resins according to the invention in a suitable manner.

The polyfunctional SH compounds (component C) can be reaction products of organic dihalides with sodium polysulfide. Further SH compounds are, for example, reaction products of linear polyesters, polyethers or polyurethanes, containing hydroxyl groups, with mercaptocarboxylic acids such as mercaptoacetic acid, 2-mercaptopropionic acid, 3-mercaptopropionic acid, mercaptobutyric acid and the like.

Elasticizing polyphenols suitable for component (C) are of the general formula explained above

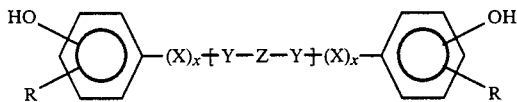

This component (C) can be advantageously prepared, for example, in the following manner. One mole of a higher-molecular diol, for example of a polyesterdiol, a polycaprolactone-diol, a polyether-diol, a polycarbonate-diol or the like, is esterified with two moles of a hydroxyphenylcarboxylic acid or reacted with two moles of a hydroxyphenylcarboxylic acid ester. Suitable hydroxycarboxylic acids are n-hydroxybenzoic acid, n-hydroxyphenylacetic acid and 3-(4-hydroxyphenyl)-propionic acid, or esters thereof. If the hydroxylphenyl group is attached by transesterification, basic transesterification can also be carried out and the alkali metal phenolates of the corresponding hydroxyphenylcarboxylic acid esters can be used for this purpose. After the end of the reaction, the product must be processed under acidic conditions in order to obtain the desired polyphenol.

For direct esterification, N-(4-hydroxyphenyl)-glycine can, for example, also be used. In a further variant, any acidic polyesters can be reacted with n-hydroxyaniline to give the desired polyphenols.

In another advantageous embodiment, polyetherdiamines or similar polyamines are reacted with, for example, 4-hydroxy-3-methoxybenzaldehyde to give the polyphenols.

The starting polyepoxide is reacted with the low-molecular monoalcohol, which may also contain one or more further, sterically strongly hindered hydroxyl groups, in such a stoichiometric ratio that higher-molecular epoxide resins are obtained. The epoxide resins, which still contain intact oxirane groups, can then be mixed in the usual manner with curing agents, if appropriate from a solution.

Virtually any compounds which are at least bifunctional and react with oxirane groups can be used as curing agents, for example polyalcohols, polyphenols, polycarboxylic acids and their anhydrides, and amides, amines, polyisocyanates, phenoplasts, and the like. These mixtures can be used for cold-curing and hot-curing coatings, for filled and unfilled casting resins, for example for potting electronic components and the impregnation of windings. Furthermore, these mixtures are suitable as binders for fiber-reinforced resins and for high-grade adhesives.

For the use of the epoxide resins according to the invention in aqueous systems, it is necessary to introduce ionic groups in the resins. Thus, acid groups can be introduced by suitable methods and, after neutralization with amines, these give a water-soluble resin.

For the electrocoating of metallic substrates, which has in the meantime found wider acceptance, cathodic electrocoating is nowadays preferentially used. In this case, the resin carries positive charges.

These can be generated, for example, by reacting the epoxide resins with amines and subsequent neutralization with carboxylic acids.

The amine used for this reaction with the epoxide compound can be primary or secondary, secondary amines being particularly suitable. Primary and secondary amines can be added directly to the epoxide ring. Tertiary amines can be incorporated in the molecule only via a further functional group. Preferably, the amine should be a water-soluble compound. Examples of such amines are mono- and di-alkylamines, such as methylamine, ethylamine, propylamine, butylamine, dimethylamine, diethylamine, dipropylamine, methylbutylamine and the like. Alkanolamines, for example methylethanolamine, diethanolamine and the like, are likewise suitable. In addition, dialkylaminoalkylamines, for example dimethylaminoethylamine, diethylaminopropylamine and the like, are suitable.

In most cases, low-molecular amines are used, but it is also possible to employ higher-molecular monoamines.

Polyamines having primary and secondary amino groups can be reacted in the form of their ketimines with the epoxide groups. The ketimines are prepared from the polyamines in a conventional manner.

The amines can also contain further groups, but these should not interfere with the reaction of the amine with the epoxide group, nor lead to gelling of the reaction mixture.

The reaction of the amine with the compound containing epoxy groups frequently starts even during the mixing of these materials. In some cases, however, heating to moderately elevated temperatures may be desirable, for example to 50° to 150° C., but reactions are also possible at lower and higher temperatures. Frequently, it is advantageous to raise the temperature at least slightly for a sufficient period towards the end of the reaction, in order to ensure complete conversion.

For the reaction with the epoxy-containing compound, sufficient amine should be so used that the resin assumes a cationic character, i.e. that it migrates to the cathode under the reaction of a voltage in the coating bath, provided that it has been rendered soluble by addition of an acid. Virtually all the epoxy groups of the resin can be reacted with an amine. It is also possible, however, to leave excess epoxy groups in the resin, and these hydrolyze on contact with water, hydroxyl groups being formed.

A further possibility for obtaining the requisite dispersibility in water is the use of Mannich bases, i.e. reaction products of suitable phenols, carrying groups suitable for a reaction with an epoxide ring, with formaldehyde and a secondary amine. In this way, the binder becomes self-crosslinkable at the same time.

Acids which are suitable for neutralizing the amines and which can be used in the invention, include boric acid or other acids having a dissociation constant constant greater than that of boric acid, preferably organic acids having a dissociation constant greater than about $1 \times 10^{-5}$. The preferred acid is acetic acid. Examples of other acids are formic acid, lactic acid, propionic acid, butyric acid, hydrochloric acid, phosphoric acid, sulfuric acid and carbonic acid.

The requisite charges can also be generated by reacting the oxirane groups with salts of an amine or of a sulfide/acid mixture or phosphine/acid mixture. The salt of a tertiary amine can be used as the salt of an amine.

The amine moiety of the amine/acid salt is an amine which can be unsubstituted or substituted, as in the case of hydroxylamines, and these substituents should not interfere with the reaction of the amine/acid salt with the polyepoxide, and the reaction mixture should not gel. Preferred amines are tertiary amines, such as dimethylethanolamine, triethylamine, trimethylamine, triisopropylamine and the like. Examples of other suitable amines are given in U.S. Pat. No. 3,839,252 in column 5, line 3, to column 7, line 42.

The amine/acid salt mixture is obtained in the conventional manner by reacting the amine with the acid. Amine/acid mixtures can also be used, even though these react as a rule with formation of the salt of the acid.

The temperature for the reaction of the amine/acid salts with the polyepoxides can be varied within the range from the lowest temperature at which the reaction proceeds at a significant rate, for example room temperature or as a rule slightly above room temperature, up to a maximum temperature from about 100 to about 110° C. A solvent is not necessary in the reaction, even though a solvent is frequently added in order to facilitate control of the reaction. Suitable solvents are aromatic hydrocarbons or monoalkyl ethers of ethylene glycol.

The ratio of the amine/acid salt and the epoxy compound can vary, and the optimum ratios depend on the particular starting materials. In general, about 1 to about 50 parts by weight of salt per 100 parts by weight of polyepoxide can be used. In general, the ratio is selected as a function of the nitrogen content derived from the quaternizing agent; typically this amounts to about 0.05 to about 16%, based on the total weight of the amine salt and the polyepoxide.

The resins can contain all the nitrogen in the form of chemically bound quaternary ammonium salt groups, even though less than 100% of the nitrogen is present in some cases in the form of quaternary ammonium salt groups. This is the case, for example, when primary and secondary amines are used for the preparation of the resins with ammonium salt groups. Such resins contain as a rule secondary and tertiary amine salt groups.

Resins with phosphonium groups can be prepared by reacting the epoxide compounds defined above with a phosphine in the presence of an acid, a resin having a group of a quaternary phosphonium base being formed.

Any phosphine which does not contain interfering groups can be used. Examples of such phosphines are aliphatic, aromatic or alicyclic phosphines, and the following phosphines may be mentioned as specific examples:

Lower trialkylphosphines, such as trimethylphosphine, triethylphosphine, tripropylphospine, tributylphosphine, mixed lower alkylphenylphosphines, such as phenyldimethylphosphine, phenyldiethylphosphine, phenyldipropylphosphine, diphenylmethylphosphine, diphenylethylphosphine and diphenylpropylphosphine, triphenylphosphine, alicyclic phosphines, such as tetramethylene-ethylphosphine, and the like.

Any acid forming a quaternary phosphonium salt can be used. Preferably, however, the acid is an organic carboxylic acid. Examples of suitable acids are boric acid, lactic acid, formic acid, acetic acid, propionic acid, butyric acid, hydrochloric acid, phosphoric acid and sulfuric acid.

Preferably, the acid should have a dissociation constant greater than about $10^{-5}$.

The ratio of phospine and acid is not particularly critical. Since one equivalent of acid is required for forming one mole of a phosphonium group, at least about one equivalent of acid is preferably used for each mole of the desired conversion of phosphine into phosphonium.

The phosphine/acid mixture and the epoxide compound are reacted by mixing the components, sometimes with heating to moderately elevated temperatures. The reaction temperature is not particularly critical, and is selected as a function of the starting materials and their reaction rates. Frequently, the reaction proceeds at a satisfactory rate at room temperature or at temperatures raised up to 70° C. In some cases, it is advisable to use higher temperatures, such as about 110° C. or higher. A solvent is not necessary, even though it can frequently be used for improving control of the reaction. Examples of suitable solvents are aromatic hydrocarbons, monoalkyl ethers of ethylene glycol and aliphatic alcohols. The quantitative proportions of the phosphine and the epoxide compound can be varied, and the optimum proportions depend on the particular starting materials. Usually, however, about 1 to about 50 parts by weight of phosphine are used per 100 parts by weight of the epoxide compound. The quantitative proportions are frequently stated by reference to the proportion of phosphine and, typically, about 0.1 to about 35% by weight of phosphine, based on the total weight of phosphine and epoxide compound, are used.

Resins with sulfonium groups can be prepared by reacting the epoxy compounds defined above with a sulfide in the presence of an acid, a resin having groups of a tertiary sulfonium base being formed.

Any sulfides which react with epoxy groups and do not contain groups interfering with the reaction can be used. The sulfide can be an aliphatic, mixed aliphatic-aromatic, aralkylic or cyclic sulfide. Examples of such sulfides are dialkyl sulfides, such as diethyl sulfide, dipropyl sulfide, dibutyl sulfide or dihexyl sulfide, or alkyl phenyl sulfides, such as diphenyl sulfide and ethyl phenyl sulfide, alicyclic sulfides, such as tetramethylene sulfide and pentamethylene sulfide, hydroxyalkyl sulfides, such as thiodiethanol, thiodipropanol and thiodibutanol, and the like.

Any acid which forms a tertiary sulfonium salt can be used. Preferably, however, the acid is an organic carboxylic acid. Examples of suitable acids are boric acid, formic acid, lactic acid, acetic acid, propionic acid, butyric acid, hydrochloric acid, phosphoric acid and sulfuric acid. Preferably, the acid has a dissociation constant greater than about $1 \times 10^{-5}$.

The ratio of sulfide and acid is not particularly critical. Since one equivalent of acid is used for the formation of one mole of a sulfonium group, preferably at least one equivalent of acid is used for every desired mole to be converted from sulfide to sulfonium.

The sulfide/acid mixture and the epoxide compound are reacted by mixing the components and heating them as a rule to moderately elevated temperatures, such as 70° to 110° C. A solvent is not necessary, although frequently a solvent is used in order to achieve better control of the reaction. Suitable solvents are aromatic hydrocarbons, monoalkyl ethers of ethylene glycol and aliphatic alcohols. The quantitative proportions of the sulfide and the epoxide compound can be varied, and the optimum ratios of the two components depend on the particular starting materials. Usually, however, about 1 to 50 parts by weight of sulfide are used per 100 parts by weight of epoxy compound. The quantitative ratios are frequently related to the sulfur content which typically is about 0.1 to 35%, based on the total weight of the sulfide and epoxy compound.

In order to obtain highly resistant coatings when the binders according to the invention are used, it is advantageous to add to the electrocoating a crosslinking agent which effects crosslinking of the binder at elevated temperatures or to modify the binder in such a way that it contains reactive groups which effect self-crosslinking at elevated temperatures. A self-crosslinking system can advantageously be obtained by reacting the binder with a partially blocked polyisocyanate which has one free isocyanate group per molecule on average and the blocked isocyanate groups of which are stable at room temperature and are unblocked at elevated temperatures and react with the hydroxyl groups formed by the opening of the epoxide rings, a urethane being formed.

Frequently applied methods for the crosslinking of binders have been published, for example, in German Offenlegungsschriften Nos. 2,057,799 and 2,752,256, and in European Patent Applications Nos. 12,463 and 4,090. However, this listing does not restrict the type of crosslinking agents.

If crosslinking agents are used, they amount as a rule to about 5 to about 60% by weight of the binder. About 20 to about 40% by weight of binder are preferred.

Blocked polyisocyanates are preferably used as the crosslinking agents. Any polyisocyanates can be used in the invention, in which the isocyanate groups have been reacted with a compound in such a way that the blocked polyisocyanate formed is resistant to hydroxyl groups at room temperature but reacts at elevated temperatures, as a rule in the range from about 90 to about 300° C. Isocyanates of about 3 to about 36 carbons, in particular about 8 to about 15 carbons, are preferred.

The organic polyisocyanates to be used as crosslinking agents in the invention can also be prepolymers which are derived, for example, from a polyol including a polyether-polyol or a polyester-polyol. As is known, polyols are reacted for this purpose with an excess of polyisocyanates, so that prepolymers with terminal isocyanate groups are formed.

Any suitable aliphatic, cycloaliphatic or aromatic monohydric alcohols can be used for blocking the polyisocyanates. Small proportions of higher-molecular monohydric alcohols of relatively low volatility can also be used in addition, if desired, these alcohols acting as plasticizers in the coatings, after they have been split off.

Other suitable blocking agents are hydroxyamines, such as ethanolamine, and oximes, such as methyl ethyl ketone oxime, acetone oxime and cyclohexanone oxime.

The blocked polyisocyanates are prepared by reacting a sufficient quantity of an alcohol with the organic polyisocyanate in such a way that free isocyanate groups are no longer present. The reaction of the organic polyisocyanate with the blocking agent is exothermic. For this reason, the polyisocyanate and the blocking agent are preferably mixed at a temperature which does not exceed 80° C. and, in particular, is below 50° C., in order to counteract the exothermic effect.

The polyisocyanates and blocking agents mentioned can, in appropriate quantitative ratios, also be used for the preparation of the partially blocked polyisocyanates described above.

The onium-modified binders according to the invention are also suitable in a special manner for the preparation of pigment pastes, i.e. the binder is used as a grinding resin.

When the resin according to the invention is used as a grinding resin for the preparation of a pigment paste, the quantitative ratios of the epoxy-containing organic material and of the organic tertiary amine, which are reacted with one another, are preferably selected such that the carrier resin contains 0.8 to 2.0 nitrogen atoms per molecule. Lower quantities of quaternary nitrogen can lead to poor wettability of the pigment, whereas larger quantities have the consequence that the resins are excessively soluble in water.

Pigment pastes according to the invention are prepared by comminuting or dispersing a pigment in the grinding resin in the well-known manner. The pigment paste contains the grinding resin and at least one pigment as the essential constituents.

In addition, however, the pigment composition can also contain other conventional additives, such as plasticizers, wetting agents, surfactants or antifoams.

Grinding of the pigments is carried out as a rule in ball mills, sand mills, Cowles mills and continuous grinding equipment, until the pigment has been comminuted to the desired particle size and, preferably, has been wetted by the resin or dispersed therein. After comminution, the particle size of the pigment should be in the range of 10 micron or smaller. In general, the comminution is taken to a Hegman fineness of about 6 to 8.

Preferably, grinding is carried out in an aqueous dispersion of the grinding resin. The quantity of water present in the mass to be ground should be sufficient to form a continuous aqueous phase.

The well-known pigments can be used as the pigment in the invention. In general, titanium dioxide is the only or the main white pigment. However, other white pigments or extenders, such as antimony oxide, zinc oxide, basic lead carbonate, basic lead sulfate, barium carbonate, porcelain, clay, calcium carbonate, aluminum silicate, silica, magnesium carbonate and magnesium silicate, can also be used. Examples of colored pigments which can be used are cadmium yellow, cadmium red, carbon black, phthalocyanine blue, chromium yellow, toluidine red and hydrated iron oxide. For further general references to the comminution of pigments and the formulation of paints, the following books are quoted:

D. H. Parker, Principles of Surface Coating Technology, Interscience Publishers, New York (1965)

R. L. Yates, Elektropainting, Robert Draper Ltd., Teddington England (1966)

H. F. Payne, Organic Coating Technology, volume 2, Wiley and Sons, New York (1961).

The invention also relates to a process for preparing binders, which comprises reacting (A) a diepoxide, or a mixture of diepoxides, having an epoxide equivalent weight of less than 500, at temperatures from 100° to 180° C. in a solvent free of hydroxyl groups, in the presence or absence of a tertiary amine as a catalyst with (B) compounds with a hydroxyl group, which is reactive towards epoxide groups, in a molar ratio of 2:1 to 7:6, preferably 2:1 to 5:4, and particularly preferably 2:1 to 4:3, to give a synthetic resin having terminal epoxide groups and a mean molecular weight from 400 to 5000.

This side chain-modified polyepoxide, which may have been elasticized by component (C), can be further reacted with amines for use in aqueous systems.

Advantageous embodiments of the process according to the invention can be seen from claims 8 to 12.

The process is carried out as follows: component A and component B are mixed and, in the presence or absence of catalysts, for example tertiary amines, are completely converted at temperatures from 100° to 140° C., preferably 115° to 135° C. The reaction can be monitored by means of the epoxide equivalent weight. This reaction product of components A and B can be further modified with component C at temperatures from 100° to 170° C. This reaction can also be followed by means of the epoxide equivalent weight. The reaction product thus obtained still contains free epoxide groups.

For this reaction step, the same catalysts as in the reaction of components A and B can be used. The reaction product thus obtained can, if desired, be reacted with amines at temperatures from 90 to 120° C., so that a binder containing basic amino groups is formed. The basic reaction product can be wholly or partially protonized by the addition of acids and can then be dispersed in water. The cross-linking agent can be admixed to the binder before the dispersion in water or, depending on the reactivity, it can be introduced during the preparation of the binder. In the case of partially blocked polyisocyanates, these are reacted with the binder at temperatures from 80° to 150° C., preferably 100° to 130° C. The binders obtained are stable dispersions which are easy to handle. In some cases, it can also be appropriate to dissolve the binders in suitable organic solvents before preparing the dispersion. Examples of suitable solvents are glycol ethers, ethylglycol, butylglycol, ketones such as diethyl ketone, methyl ethyl ketone and methyl isobutyl ketone, and others.

The invention also relates to the use of the binders for electrocoating baths.

The electrocoating baths can contain conventional pigments. Frequently, a dispersant or a surfactant is added to the pigments. The pigment and the surfactant, if used, are ground together in a part of the binder, or by themselves, in order to prepare a paste which is extended by the remaining binder for preparing the coating composition.

In some cases, it is advantageous to add to the electrocoating bath a non-ionic modifier or solvent, in order to improve the dispersibility, the viscosity and/or the film quality. Examples of such materials are aliphatic, naphthenic and aromatic hydrocarbons or mixtures thereof, mono- and di-alkyl ethers of glycols, Siberian pine needle oil and other solvents which are compatible with the resin system. The modifier preferred at present is propylene glycol phenyl ether.

Furthermore, other additives such as antioxidants can be added to the electrocoating bath. Examples are ortho-amylphenol or cresol. The addition of such antioxidants is particularly desirable whenever the deposition baths are exposed to atmospheric oxygen at elevated temperatures for prolonged periods with stirring.

Other additives which the bath may contain are wetting agents, such as petroleum-sulfonates, sulfated fatty amines or amides thereof, esters of sodium isethionates, alkylphenoxypolyethylene alcohols or phosphate esters, including ethoxylated alkylphenol phosphates. Other groups of possible additives are antifoams and suspending agents. Ordinary tap water can be used for formulating the deposition bath. However, since such water contains relatively high proportions of salts, undesired changes can therefore occur during the electrodeposition. Deionized water is therefore generally preferred. The above list of possible additives is not complete, since many other additives which do not interfere with the electrodeposition can be used.

The invention also relates to a process for electrophoretically coating an electrically conductive substrate, connected as the cathode, from an aqueous bath based on a cationic binder at least partially neutralized with acids, the binders having been rendered self-crosslinkable by a reaction or the bath containing an additional crosslinking agent, wherein the binders are reaction products of (A) a diepoxide, or a mixture of diepoxides, having an epoxide equivalent weight of less than 500, with (B) compounds with a hydroxyl group, which is reactive towards epoxide groups, in a molar ratio of 2:1 to 7:6, preferably 2:1 to 5:4, and particularly preferably 2:1 to 4:3, at temperatures from 100° to 180° C. in an organic solvent free of hydroxyl groups, in the presence or absence of a tertiary amine as a catalyst, the synthetic resin having terminal epoxide groups and a mean molecular weight from 400 to 5000.

This side chain-modified polyepoxide, which may have been elasticized by component (C), is further reacted with amines.

The substrate in the electrodeposition can be any electrically conductive substrate. Usually, these are metal substrates, for example iron, steel, copper, zinc, brass, tin, nickel, chromium and aluminum as well as other metals, pretreated metals, and also phosphatized or chromized metals. Impregnated paper and other conductive substrates can also be used.

In the cationic deposition, the articles to be coated are immersed in an aqueous dispersion of the solubilized film-forming cationic binder. An electric voltage is applied between the article to be coated, which functions as the cathode, and an anode, and the cationic binder is deposited on the cathode by the electric current. The article is then taken out of the bath and as a rule rinsed. The coating is then cured in the conventional manner by heating.

The invention is explained in more detail in the examples which follow. All the data on parts and percentages are by weight, unless explicitly stated otherwise.

Preparation of crosslinking agent I

According to German Offenlegungsschrift No. 2,701,002, Example 1, a blocked isocyanate crosslinking agent (polyurethane crosslinking agent) is prepared by adding 218 parts of 2-ethylhexanol slowly to 291 parts of an 80/20 isomer mixture of 2,4-/2,6-toluylene diisocyanate with stirring and under a nitrogen atmosphere, the reaction temperature being kept below 38° C. by external cooling. The batch is maintained for a further half an hour at 38° C. and is then heated to 60° C., whereupon 75 parts of trimethylolpropane and then 0.08 part of dibutyl-tin dilaurate as a catalyst are added. After an exothermic reaction at the start, the batch is maintained for 1.5 hours at 121° C., until substantially all the isocyanate groups have been consumed, which is detectable in the infrared spectrum. The batch is then diluted with 249 parts of ethylene glycol monoethyl ether.

Preparation of crosslinking agent II

A polyester crosslinking agent is prepared according to European Pat. No. 0,040,867, Example 2d): 192 parts of trimellitic anhydride and 500 parts of Versatic acid glycidyl ester having an epoxide equivalent weight of 250 are mixed and heated to 100° C., with stirring. An exothermic reaction takes place, and the temperature rises to 190° C. After cooling to 140° C., 2 parts of benzyldimethylamine are added. The mixture is maintained at 140° C. for 3 hours. This gives a viscous, clear product, which is additionally diluted with 295 parts of ethylene glycol monobutyl ether.

Preparation of crosslinking agent III

A crosslinking agent which carries β-alkoxyalkyl ester groups active for crosslinking is prepared as follows:

In a reaction vessel which can be heated by a heat transfer oil and is fitted with a water separator, reflux condenser and an interposed Raschig column, 1000 g of succinic anhydride (10 mol) are added to 1462 g of hexylglycol (10 mol), with stirring and under an inert gas supply. The reaction mixture is heated to 120° C., the temperature being briefly raised to 130° C. by the exothermic heat of reaction. The temperature is maintained, until the acid number is 230 mg of KOH/g.

400 g of xylene, 5 g of N-cetyl-N,N,N-trimethylammonium bromide and 940 g of a bisphenol A epoxide resin having an epoxide eouivalent weight of 188 (2.5 mol) are then added. Within 1 hour, the temperature is raised again to 130° C. and maintained there until the epoxide number has fallen to zero. After the addition of 2 g of p-toluene sulfonic acid solution (25% in n-propanol), the temperature is raised to 200° C. in the course of 4 hours, while the water of reaction formed is continuously removed from the system. The temperature is raised further to 220° C. and maintained there until approximately 90 g of water have been separated off and the acid number has fallen to less than 2 mg of KOH/g of solid resin. The mixture is then cooled and discharged without dilution. Solids content: 95.2% by weight (measured after heating to 130° C. for 1 hour)

Acid number: 1.1 mg of KOH/g of solid resin

Viscosity: 480 mPas (measured at 25° C. after dilution with methyl isobutyl ketone to 70% by weight)

Preparation of crosslinking agent IV 2340 g of the glycidyl ester of 2-methyl-2-ethylheptanoic acid are heated with 2073 g of trimellitic anhydride to 130° C. in a reaction vessel. While the mixture is being heated up, the strongly exothermic reaction starts. The reaction mixture is kept at 150° C. by external cooling, until an acid number of 183 has been reached. The mixture is then cooled to 90° C. and 1450 g of MIBK (methyl isobutyl ketone) are added. Subsequently, 835 g of propylene oxide are slowly added dropwise. At an acid number of 2, the reaction is stopped. The solids content of the resin solution is adjusted to 70% with more MIBK.

Preparation of elasticized polyphenol I 500 g of a polycaprolactone-diol (OH number 210.9) and 286 g of methyl p-hydroxybenzoate are introduced into a suitable reaction vessel with facilities for introducing blanketing gas. The mixture is heated to 140° C. and homogenized. 3.9 g of tin octoate are then added and the mixture is heated to 180° C., the elimination of methanol starting. After the end of the elimination, the mixture is stirred for a further hour at 180° C. and the product is then cooled.

Preparation of elasticized polyphenol II

The procedure is as in the preparation of polyphenol I, but 695 g of a polytetrahydrofuran-diol are used instead of the polycaprolactone-diol.

Preparation of elasticized polyphenol III 550 g of adipic acid, 262 g of neopentyl glycol, 49 g of xylene and 0.8 g of dimbutyl-tin oxide are introduced into a suitable reactor and the mixture is heated. At 132° C., water begins to separate out. The temperature is raised slowly to 186° C. and maintained until the appropriate quantity of water (90 g) has been removed from the system. The mixture is then cooled to 100°, and 274 g of p-aminophenol are added. The temperature is then raised again, and renewed eliminaticn of water starts at 162° C. The temperature is slowly raised to 185° C. and kept constant, until 45 g of water have been eliminated. Subsequently, the xylene is distilled off. For introducing the elasticized binder into the resins, the polyphenol is preheated to 100° C.

Preparation of an amine salt 528 parts of dimethylethanolamine are introduced into a suitable reaction vessel. 712 parts of 88% lactic acid are then added with vigorous stirring, followed by 560 parts of deionized water. Due to the heat of neutralization, the temperature rises. After the end of the addition, it is held at 85° C. for a further 3 hours. The mixture is then cooled, and the amine salt solution is filtered.

Preparation of a sulfide/acid salt mixture

The procedure followed is as in the preparation of the amine salt, but the following components are used:
617 parts of bis-(2-hydroxyethyl) sulfide
662 parts of 88% lactic acid
521 parts of deionized water

Preparation of a semi-masked isocyanate 107 parts of 2,4-toluylene diisocyanate and 11 parts of methyl isobutyl ketone are introduced into a dry reactor under a blanketing gas. 82 parts of 2-ethylhexanol are added dropwise to the mixture. During this addition, the temperature must not exceed 65° C. After the end of the addition, the temperature is maintained for a further 2 hours and the mixture is then cooled to room temperature. Until it is used further, the product must be kept dry and under a blanketing gas.

Preparation of binder I 1560 parts of a liquid epoxide resin based on bisphenol A and having an epoxide equivalent weight of 188 are introduced, together with 242 g of hexylglycol, 41 parts of xylene and 7 parts of dimethylbenzylamine, into a reaction vessel fitted with a stirrer, reflux condenser, internal thermometer and nitrogen inlet. The reaction mixture is heated to 130° C. and maintained at this temperature until the epoxide equivalent weight has reached a value of 350. The reaction mixture is then heated to 160° C. and 378 parts of bisphenol A are added at the same time. After a reaction period of 20 minutes at this temperature, the mixture is cooled to 100° C. and diluted with 430 parts of xylene. At this time, the epoxide equivalent weight is 1350. 122 parts of diethanolamine and 83 parts of a reaction product from equimolar amounts of N,N-diethylaminoethylamine and butylene oxide are then added. The reaction is continued for 2 hours at 105° C., before the mixture is diluted with 120 parts of hexylglycol and discharged. This gives a clear resin solution having a solids content of 80% and an MEQ-base value of 0.85 milliequivalent/g of solid resin.

The binder is then converted into aqueous dispersions. The components given in the Table which follows are mixed, and deionized water (item 1) is added. After homogenizing for 20 minutes, the mixture is diluted further with deionized water (item 2). The dispersions are then subjected to a short vacuum distillation, the organic phase being separated off from the distillate.

|  | Dispersion Ia | Dispersion Ib | Dispersion Ic |
| --- | --- | --- | --- |
| Binder from Example 1 | 937.5 | 937.5 | 937.5 |
| Crosslinking agents from Examples 2-4 |  |  |  |
| Crosslinking agent I | 528.0 | — | — |
| Crosslinking agent II | — | 528.0 | — |
| Crosslinking agent III | — | — | 388.2 |
| Dibutyl-tin dilaurate | 8.0 | — | — |
| Lead-II octoate solution (24% of Pb) | — | 28.0 | 28.0 |
| Antifoam solution | 1.2 | 1.2 | 1.2 |
| Glacial acetic acid | 23.0 | 23.0 | 23.0 |
| Deionized water 1 | 751.5 | 751.5 | 891.3 |
| Deionized water 2 | 960.0 | 960.0 | 960.0 |
| Solids content (60 minutes, 130° C.) | 34.2% | 35.1% | 34.4% |

Preparation of binder II and dispersion II 1175 parts of a commercially available epoxide resin based on bisphenol A (epoxide equivalent weight EEW=188), 325 parts of 2-ethylhexanol and 75 parts of xylene are introduced into a suitable reactor and heated to 125° C. 7 parts of dimethylbenzylamine are then added and the temperature is kept at 138° C, until an EEW of 1125 has been reached. 1155 parts of crosslinking agent I are then added. As a result, the temperature falls to 90° C. 94 parts of a reaction product of 1 mole of diethylenetriamine with 2 moles of methyl isobutyl ketone (MIBK), 70% in MIBK, and 75 parts of methylethanolamine are added. As a result, the temperature rises again. It is maintained for 1 hour at 115° C., and 123 parts of propylene glycol monophenyl ether and 60 parts of lead octoate are then mixed in. The resin is dispersed in 3861 parts of deionized water to which 26 parts of glacial acetic acid and 24 parts of a commercially available emulsifier solution had been added beforehand. The solids content of the dispersion is 35%.

Preparation of binders III and IV and of dispersions III and IV

The procedure followed is as in the preparation of binder II and dispersion II. The changed weights taken are as follows:

|  | Example III | Example IV |
| --- | --- | --- |
| Epoxide resin (EEW = 188) | 1225 | 1172 |
| Cyclohexanol | 245 | — |
| Phenylglycol | — | 322 |
| Xylene | — | 75 |
| MIBK | 73 | — |
| Dimethylbenzylamine | 7 | 7 |
| Crosslinking agent (according to Example)* | 1155 (II) | 1150 (III) |
| Diethanolamine | 171 | 82 |
| Methylethanolamine | — | 58 |
| Hexylglycol | 165 | 122 |
| Lead octoate | 68 | 60 |
| Deionized water | 3808 | 3877 |
| Glacial acetic acid | 59 | 51 |
| Emulsifier solution | 24 | 24 |

*The crosslinking agent is not added as in Example II when the EEW limit is reached (for Example III: EEW = 875, for Example IV: EEW = 930), but after the hexylglycol has been mixed in. For this purpose, the resin solution is cooled to 95°C.

Preparation of binder V 1098 parts of a commercially available epoxide resin based on bisphenol A (epoxide equivalent weight EEW=188), 322 parts of phenylglycol and 71 parts of xylene are introduced into a suitable reaction vessel and heated to 133° C. As soon as the temperature has reached 125° C., 7 parts of dimethylbenzylamine are added, and the temperature is allowed to rise further and is then maintained at 133° C., until an EEW of 1170 has been reached. The mixture is rapidly cooled to 90°, and 337 parts of the amine salt solution are added. As a result, the temperature falls even further. It is maintained at 80° C., until the acid number is <1. 1162 parts of crosslinking agent IV, 65 parts of lead octoate and 165 parts of hexylglycol are then added. This resin solution is then dispersed in 3773 parts of deionized water. The solids content of the dispersion is 35%.

Preparation of binder VI

The procedure is as in the preparation of binder dispersion V, but the following components were used.

| | |
|---|---|
| Epoxide resin (EEW 188) | 1077 parts |
| Hexylglycol | 314 parts |
| Methyl isobutyl ketone | 90 parts |
| Dimethylbenzylamine | 7 parts |
| Stopped at EEW = 930 | |
| Amine salt solution | 392 parts |
| Crosslinking agent I | 1157 parts |
| Propylene glycol monophenyl ether | 135 parts |
| Deionized water | 3828 parts |

Preparation of binder VII

A reactor fitted with a heating device, a stirrer, a cooler, a thermometer and a nitrogen inlet is charged with 1053 parts of a bisphenol A epoxy resin having an epoxide equivalent weight of 188, 205 parts of hexylglycol, 20 parts of xylene and 5 parts of dimethylbenzylamine. The temperature is raised to 131° C. and the reaction is continued until an epoxide equivalent weight of 440 has been reached. 376 parts of a commercially available polycaprolactone-diol of molecular weight 535 and a further 2 parts of dimethylbenzylamine are then added. The reaction is continued at 131° C., until the reaction mixture has an epoxide equivalent weight of 1100. 1260 parts of crosslinking agent I are then added. The reaction temperature is lowered to 90° C. by external cooling. 110 parts of a reaction product of 1 mole of diethylenetriamine and 2 moles of methyl isobutyl ketone (70% in methyl isobutyl ketone) and 83 parts of N-methylethanolamine are then added to the reaction mixture, the temperature rising exothermally to 115° C. The temperature is then held at 110° C. for 1 further hour. Subsequently, the reaction batch is diluted with 134 parts of propylene glycol phenol ether, cooled to 95° C. and discharged. This gives a clear resin solution.

Meanwhile, a dispersing bath is prepared from 1472 parts of deionized water, 23 parts of glacial acetic acid and 1 part of a commercially available antifoam, and 1800 parts of the resin solution described above are introduced into this bath. The dispersion mixture is stirred for a further 2 hours, before dilution with a further 942 parts of deionized water. This gives a Low-viscosity dispersion having a solids content of 35%.

Preparation of binder VIII

| | |
|---|---|
| Epoxide resin having an EEW of 188 | 978 parts |
| 2-Ethylhexanol | 109 parts |
| Xylene | 19 parts |
| Dimethylbenzylamine | 5 parts |
| Polycaprolactone-dlol MW = 535 | 349 parts |
| Dimethylbenzylamine | 2 parts |
| Crosslinking agent I | 1156 parts |
| Diethylenetriamine ketimine according to Example 1 | 102 parts |
| N—Methylethanolamine | 77 parts |
| Propylene glycol phenol ether | 122 parts |
| Resin solution | 1800 parts |
| Deionized water | 1472 parts |
| Glacial acetic acid | 24 parts |
| Antifoam | 1 part |
| Deionized water | 942 parts |

The procedure is analogous to the Example of the preparation of binder VII, but in this case 2-ethylhexanol is used as the monoalcohol. This gives an aqueous dispersion having a solids content of 35%.

Preparation of binder IX 718 parts of a commercially available epoxide resin based on bisphenol A (epoxide equivalent weight EEW 188), 132 parts of phenylglycol and 51 parts of xylene are introduced into a suitable reactor and heated to 130° C. 5 parts of dimethylbenzylamine are then added. After the exothermic reaction has subsided, the temperature is maintained at 137° C., until an EEW of 425 has been reached, and 287 parts of a dimer fatty acid (Pripol 1022 from Unichema) and 3 parts of dimethylbenzylamine are then added and the reaction is continued at 130° C., until an EEW of 1130 has been reached. The mixture is then cooled to 90° C.

36 parts of methylethanolamine and 50 parts of diethanolamine are then added. Due to the exothermic reaction, the temperature rises and is maintained for 1 hour at 115° C. 750 parts of crosslinking agent IV, 118 parts of hexylglycol and 43 parts of lead octoate are then added and mixed in for 30 minutes at 90° C. The resin solution is then dispersed in 2760 parts of deionized water, 18 parts of an emulsifier solution and 29 parts of glacial acetic acid. The solids content of the dispersion is 35%.

Preparation of binder X 703 parts of a commercially available epoxide resin based on bisphenol A (epoxide equivalent weight—EEW—188), 133 parts of 3-cyclohexylpropanol and 42 parts of xylene are introduced into a suitable reactor. The reaction batch is heated to 130° C., and 4 parts of dimethylbenzylamine are added. After the exothermic reaction has subsided, the batch is maintained at 137° C., until an EEW of 430 has been reached. 291 parts of a reaction product of 1 mole of hexamethylenediamine and 2 moles of Cardura E 10 (EEW 254) are then added. The batch is then maintained at 130° C., until an EEW of 1150 has been reached, and is then rapidly cooled to 90° C.

98 parts of diethanolamine are then added. During this addition, the temperature rises again and is maintained at 115° C. for 1 hour. 750 parts of crosslinking agent IV, 121 parts of phenylglycol and 60 parts of lead octoate are then added and mixed in at 90° C. for 30 minutes. The resin solution is then dispersed into 2813 parts of deionized water, 17 parts of an emulsifier solution and 28 parts of glacial acetic acid. The solids content is 35%.

Preparation of binders XI to XIII

The epoxide resin (based on bisphenol A, epoxide equivalent weight EEW=188) together with the monoalcohol and xylene is introduced into a suitable reactor, and the mixture is heated to 125° C. Dimethylbenzylamine is then added, and a temperature of 135° C. is maintained, until the EEW of the 1st stage has been reached. The elasticized diphenol is then added, and the reaction is continued at 135° C., until the 2nd EEW stage has been reached. The crosslinking agent is then added, causing the temperature to fall to 90° C. The amines are then mixed in. As a result, the temperature rises and is maintained for 1 hour at 110° C. Hexylglycol and, if appropriate, lead octoate are then added. The resin solution is dispersed in deionized water, to which glacial acetic acid and a commercially available emulsifier mixture have been added beforehand.

The amounts used are listed in the table which follows.

| Binder dispersion | XI | XII | XIII |
|---|---|---|---|
| Epoxide resin | 870 | 860 | 909 |
| Hexylglycol | 169 | — | — |
| 2-Ethylhexanol | — | 149 | — |
| Phenylglycol | — | — | 167 |
| Xylene | 51 | 50 | 54 |
| Dimethylbenzylamine | 5 | 5 | 5 |
| Diphenol/type | 446/I | 510/II | 457/III |
| Ketimine | 124 | — | — |
| Methylethanolamine | 69 | — | 45 |
| Diethanolamine | — | 120 | 64 |
| Crosslinking agent/type | 1155/I | 1155/II | 1155/III |
| Hexylglycol | 159 | 147 | 122 |
| Lead octoate | — | 73 | 61 |
| Deionized water | 3894 | 3863 | 3897 |
| Glacial acetic acid | 34 | 41 | 40 |
| Emulsifier solution | 24 | 25 | 24 |
| EEW 1st stage | 430 | 430 | 430 |
| EEW 2nd stage | 1225 | 1250 | 1200 |

Preparation of binder dispersion XIV 1116 parts of a commercially available epoxide resin based on bisphenol A (epoxide equivalent weight EEW=188), 325 parts of 2,2,4-trimethylpentane-1,3-diol and 87 parts of xylene are introduced into a suitable reactor and heated to 125° C. 7 parts of dimethylbenzylamine are added, and the temperature is allowed to rise to 137° C. This temperature is maintained until an EEW of 940 has been reached. 1155 parts of crosslinking agent I are then added, causing the temperature to fall to 95° C. 160 parts of a reaction product of 1 mole of diethylenetriamine and 2 moles of methyl isobutyl ketone (MIBK), 70% in MIBK, and 89 parts of methylethanolamine are then added. As a result, the temperature rises and is maintained for 1 hour at 110° C. 171 parts of hexylglycol are then added and mixed in for 15 minutes. The resin solution is then dispersed in 3829 parts of deionized water, 36 parts of glacial acetic acid and 25 parts of an emulsifier solution. The solids content of the dispersion is about 35%.

Preparation of binder dispersions XV to XVII

The epoxide resin, the diol and the xylene are introduced into a suitable reactor. This mixture is heated to 125° C., and dimethylbenzylamine is added. The reaction is then continued at 135° C., until the EEW of the first stage has been reached. The elasticizing component and, if appropriate, further dimethylbenzylamine are then added. The reaction is continued until the EEW of the second stage has been reached. The amines are then added, and the temperature is maintained for 1 hour at 115° C. Subsequently, hexylglycol, lead octoate and crosslinking agent are added, and these are mixed in at 85° C. The resin solution is then dispersed in deionized water to which glacial acetic acid and an emulsifier solution have been added. The particular weights used are listed in the table which follows.

| Dispersion | XV | XVI | XVII |
|---|---|---|---|
| Epoxide resin | 970 | 937 | 942 |
| 2,2,4-Trimethylpentane-1,3-diol | 188 | — | — |
| 2-Methylpropane-1,2-diol | — | 112 | 113 |
| Xylene | 69 | 52 | 53 |
| Dimethylbenzylamine | 6 | 5 | 5 |
| EEW 1st stage | 430 | 405 | 405 |
| Polycaprolactone-diol | 348 | — | — |
| Dimethylbenzylamine | 4 | — | — |
| Polyphenol I | — | 481 | — |
| Polyphenol II | — | — | 474 |
| EEW 2nd stage | 1130 | 1170 | 1170 |
| Methylethanolamine | — | 47 | 47 |
| Diethanolamine | 135 | 65 | 66 |
| Crosslinking agent II | 1155 | 1155 | 1155 |
| Hexylglycol | 147 | 159 | 123 |
| Lead octoate | 61 | 61 | 61 |
| Deionized water | 3843 | 3857 | 3888 |
| Glacial acetic acid | 50 | 45 | 49 |
| Emulsifier solution | 24 | 24 | 24 |

Preparation of binder I for a grinding resin 800 parts of butylglycol are added to 953 parts of a commercially available epoxide resin based on bisphenol A and having an epoxide equivalent weight of 890. The mixture is heated to 80° C. 221 parts of a reaction product of 101 parts of diethanolamine and 120 parts of 80% aqueous lactic acid are then added to the resin solution. The reaction is carried out at 80° C., until the acid number has fallen to less than 1.

Preparation of binder II for a grinding resin 1092 parts of a commercially available epoxide resin based on bisphenol A (epoxide equivalent weight EEW=188), 283 parts of 2-ethylhexanol and 69 parts of methyl isobutyl ketone are introduced into a suitable reaction vessel and heated to 135° C. 6 parts of dimethylbenzylamine are added at 125° C. The temperature is maintained at 135° C., until an EEW of 910 has been reached. 467 parts of the semi-masked isocyanate are then added and the batch is maintained at 125° C. for 1 hour. 677 parts of butyl glycol are then added. As a result, the batch cools. The temperature is adjusted to 80° C., and 441 parts of the amine salt solution are added. The temperature is maintained at 80° C., until the acid number is <1. The resin solution is then adjusted to a solids content of 60% by means of 465 parts of butylglycol.

Preparation of binder III for a grinding resin

The procedure is as in the preparation of binder 3. However, after an EEW of 1150 has been reached, semimasked isocyanate is not added and, instead, the mixture is immediately cooled to 80° C. and the first quantity of butylglycol is added. The following components are used.

| | | |
|---|---|---|
| Epoxide resin (EEW = 188) | 1393 | parts |
| 2-Ethylhexanol | 385 | parts |
| Methyl isobutyl ketone | 89 | parts |
| Dimethylbenzylamine | 7 | parts |
| Butylglycol | 861 | parts |
| Sulfide/acid salt mixture | 474 | parts |
| Butylglycol | 291 | parts |

Preparation of binder IV for a grinding resin 1426 parts of a commercially available epoxide resin based on bisphenol A (epoxide equivalent weight EEW=188), 277 parts of 2,2,4-trimethylpentane-1,3-diol and 85 parts of methyl isobutyl ketone are introduced into a suitable reaction vessel and heated to 132° C. As soon as 125° C. have been reached, 9 parts of dimethylbenzylamine are added. The temperature is then maintained at 132° C. until an EEW of 430 has been reached. 718 parts of polyphenol II are then added. The temperature is maintained at 132° C., until an EEW of 1240 has been reached. The mixture is then rapidly cooled to 90° C., and 288 parts of the semi-masked isocyanate are added. The temperature is maintained at 90° C. for 2 hours, and 1067 parts of butylglycol and 547 parts of the amine salt solution are then mixed in. The temperature is maintained at 80° C., until the acid number is <1. The solids content of the resin solution is then adjusted to 60% by means of 583 parts of butylglycol.

within 2 minutes on zinc-phosphatized sheet metal. The bath temperature during deposition is 27° C. The deposited films are baked for 20 minutes at 180° C.

|  | Deposition results | | | | | |
|---|---|---|---|---|---|---|
| Bath | Ia | Ib | Ic | II | III | IV |
| Layer thickness (μm) at voltage (V) | 27/320 | 31/340 | 28/320 | 37/340 | 32/320 | 34/320 |
| Throwing power (cm) at voltage | 20.5/360 | 21/360 | 20.5/380 | 21/360 | 22.5/360 | 21/380 |
| Flow* | 1 | 0.5 | 0.5 | 0.5 | 0.5 | 0 |
| Crater rating* | 0.5 | 1 | 0.5 | 1 | 0 | 0 |
| Erichsen cupping test (mm) | 7.0 | 9.0 | 9.5 | 8.0 | 9.5 | 9.0 |
| Cross cut* | 0 | 0 | 0 | 0 | 0 | 0 |

*0 = best rating, 5 = poorest rating

Preparation of a gray pigment paste (I)

1800 parts of the grinding resin I and 2447 parts of deionized water are taken and blended with 2460 parts of $TiO_2$, 590 parts of an extender based on aluminum silicate, 135 parts of lead silicate and 37 parts of carbon black. This mixture is comminuted in a grinding apparatus to a Hegman fineness of 5 to 7. 1255 parts of deionized water are then added in order to obtain the desired paste consistency. This gray paste is very stable on storage.

Preparation of a gray pigment paste (II)

1800 parts of grinding resin II and 2447 parts of deionized water are taken and blended with 2460 parts of $TiO_2$, 590 parts of an extender based on aluminum silicate, 135 parts of lead silicate and 37 parts of carbon black. This mixture is comminuted in a grinding apparatus to a Hegman fineness of 5 to 7. 1255 parts of deionized water are then added in order to obtain the desired paste consistency.

Preparation of a gray pigment paste (III)

1800 parts of binder V and 2447 parts of deionized water are taken and blended with 2460 parts of $TiO_2$, 590 parts of an extender based on aluminum silicate, 13 parts of lead silicate and 37 parts of carbon black. This mixture is comminuted in a grinding apparatus to a Hegman fineness of 5 to 7. 1255 parts of deionized water are then added in order to obtain the desired paste consistency.

Preparation of a white pigment paste 1295 parts of grinding resin III are blended with 3170 parts of $TiO_2$, 30 parts of a cationic surfactant and 210 parts of butylglycol. This mixture is ground in a grinding apparatus to a Hegman fineness of less than 7. 210 parts of butylglycol are then added in order to adjust to the desired paste consistency.

Preparation of electrocoating baths I to IV and deposition of coating films 2000 parts by weight of the binder dispersions described above are in each case mixed with 775 parts by weight of the gray pigment paste. The solids content of the bath is adjusted to 20% (150° C., 30 minutes) with deionized water. The bath is then allowed to age for 3 days, with stirring. The coating films are deposited

Preparation of electrocoating baths V–VIII and deposition of coating films 2000 parts by weight of the binders V and VI described above are in each case mixed with 775 parts of the gray (II) or white pigment paste, respectively. The solids content of the bath is adjusted to 22% (150° C., 30 minutes) with deionized water. The baths are allowed to age for 3 days, with stirring. The baths were prepared from the following components.

|  | Binder V | Binder VI | White paste | Gray (II) paste |
|---|---|---|---|---|
| Bath V | x | — | — | x |
| Bath VI | x | — | x | — |
| Bath VII | — | x | — | x |
| Bath VIII | — | x | x | — |

The coating films are deposited within 2 minutes on zinc-phosphatized sheet metal. During the deposition, the bath temperature is 27° C. The deposited films are baked 20 minutes at 180° C.

| Application data and testing of the coatings | | | | |
|---|---|---|---|---|
|  | Bath V | Bath VI | Bath VII | Bath VIII |
| Layer thickness at 320 V (μm) | 30 | 32 | 27 | 33 |
| Throwing power* at 340 V (cm) | 20.8 | 19.7 | 21.5 | 20.1 |
| Erichsen cupping test (mm) | 9 | 7.3 | 8.7 | 7.6 |
| Cross cut** | 0 | 0.5 | 0 | 0.5 |
| Flow** | 0.5 | 1 | 0.5 | 0.5 |
| Cratering tendency** | 0 | 0.5 | 0 | 0 |

*according to Ford
**0 = best rating, 5 = poorest rating

Preparation of electrocoating baths IX to XII and deposition of coating films 2000 parts by weight of the binder dispersions VII to X described above are in each case mixed with 775 parts by weight of the gray pigment paste I. The solids content of the bath is adjusted to 20% (150° C., 30 minutes) with deionized water. The bath is then allowed to age for 3 days, with stirring. The coating films are deposited within 2 minutes on zinc-phosphatized sheet metal. During the deposition, the bath temperature is 27° C. The deposited films are baked for 20 minutes at 180° C.

| Deposition results | | | | |
|---|---|---|---|---|
| Bath | IX | X | XI | XII |
| Binder | VII | VIII | IX | X |
| Layer thickness (μm/V) | 35 | 34 | 28 | 31 |

-continued

| Deposition results | | | | |
|---|---|---|---|---|
| Throwing power (cm) | 19.1 | 19.5 | 21.7 | 19.3 |
| Surface* | 1 | 1 | 0.5 | 1 |
| Cratering* | 0 | 0.5 | 0 | 1 |

0 = best rating, 5 = poorest rating

Preparation of electrocoating baths XIII to XV and deposition of coating films The procedure is as in the preparation and deposition of baths IX to XII.

| Deposition results | | | |
|---|---|---|---|
| Bath | XIII | XIV | XV |
| Layer thickness at voltage (μm/V) | 37/310 | 34/340 | 32/310 |
| Throwing power at voltage (cm/V) | 19.5/320 | 21/370 | 20.5/350 |
| Flow* | 0.5 | 1 | 0.5 |
| Cratering* | 0 | 0 | 0.5 |
| Erichsen cupping test (mm) | 7.5 | 9.0 | 9.5 |

Preparation of electrocoating baths XVI to XIX and deposition of coating films The procedure is as in the preparation and deposition of baths IX to XII.

| Deposition results | | | | |
|---|---|---|---|---|
| Bath | XVI | XVII | XVIII | XIX |
| Binder dispersion | XIV | XV | XVI | XVII |
| Layer thickness (μm) at 360 V | 48 | 51 | 45 | 44 |
| Throwing power (cm) at 360 V | 19.8 | 20.7 | 21.5 | 20.3 |
| Flow* | 0.5 | 1 | 0.5 | 0 |
| Cratering* | 0 | 0 | 0 | 0 |
| Erichsen cupping test (mm) | 7 | 8.5 | >10 | >10 |

0 = best rating, 5 = poorest rating

Preparation of electrocoating baths XX and XXI and deposition of coating films The procedure is as in the preparation and deposition of baths IX to XII, but the gray pigment paste (III) is used.

| Deposition results | | |
|---|---|---|
| Bath | XX | XXI |
| Binder | XIV | XV |
| Layer thickness at 320 V (μm) | 34 | 36 |
| Throwing power* at 350 V (cm) | 20.4 | 19.7 |
| Erichsen cupping test (mm) | 8.7 | >10 |
| Cross cut** | 0 | 0 |
| Flow** | 0.5 | 0 |
| Cratering tendency** | 0 | 0 |

*according to Ford
**0 = best rating, 5 = poorest rating

Preparation of a filled molding composition 3013 parts of a commercially available epoxide resin based on perhydrogenated bisphenol A (epoxide equivalent weight 240=EEW 240) together with 612 parts of 2-ethylhexanol are introduced into a suitable reactor and heated to 125° C. 17 parts of dimethylbenzylamine are then added and, after the exothermic reaction, the temperature is maintained at 140° C., until an EEW of 1050 has been reached. The mixture is then cooled rapidly to 70° C., and 358 parts of glutaric anhydride are added.

This mixture is then mixed with 40% by weight, based on the resin/curing agent mixture, of powdered mica and homogenized in a kneader. Meanwhile, a suitable steel mold is prepared by spreading with a polyvinyl alcohol solution (release coating). In this mold, plates of 3.5 mm thickness are compression-molded at 180° C. The test plates thus produced have a dielectric strength of >600 KV/cm and a tracking resistance KB (DIN 53,480) of 450.

Preparation of an epoxide resin adhesive 2695 parts of a commercially available epoxide resin based on bisphenol A (epoxide equivalent weight EEW=177) and 788 parts of phenylglycol are introduced into a suitable reactor and heated to 125° C. 17 parts of dimethylbenzylamine are then added and the temperature is maintained at 135° C., until an epoxide equivalent weight of 870 has been reached. The batch is then rapidly cooled.

To prepare the adhesive, 90 parts of the resin are mixed with 10 parts of Versamid 140 (commercial product from Schering AG, Bergkamen, polyamide-amine). This adhesive is suitable for the bonding of metals, even of moist metal components. The adhesive is applied to the areas to be bonded, and these are fitted together and allowed to cure. The tensile strength of the bond is 300 Kp/cm².

What is claimed is:

1. A synthetic resin based on alcohol-modified polyepoxides, comprising the reaction product of:
   Component A which is a diepoxide, or a mixture of diepoxides, having an epoxide equivalent weight of less than about 500, with
   Component B which is a compound containing one hydroxyl group which is reactive with epoxide groups, wherein Component A is reacted with Component B in a molar ratio of about 2:1 to about 7:6 and at temperatures from about 100° C. to about 180° C. in an organic solvent free of hydroxyl groups, the synthetic resin having terminal epoxide groups and a mean molecular weight from about 400 to about 5000.

2. The resin according to claim 1 wherein said molar ratio is about 2:1 to about 5:4.

3. The resin according to claim 1 wherein said molar ratio is about 2:1 to about 4:3.

4. The synthetic resin according to claim 1, which comprises the reaction product of component A and B, further reacted with component C, wherein component C comprises about 5-60% by weight, based on the sum of the weights of components A, B and C, and component C is a polyhydric alcohol, a polycarboxylic acid, a polyamine or a polysulfide having a molecular weight of from about 100 to about 3500, the proportion of component C in said reaction having been selected, as a function of its molecular weight, such that the molar ratio of the reaction product of A and B relative to component C is about 4:1 to about 0.8:1.

5. The synthetic resin according to claim 4 wherein component A is reacted with component B in a molar ratio of component A to component B of about 2:1 to about 5:4.

6. The synthetic resin according to claim 4 wherein component A is reacted with component B in a molar ratio of component A to component B of about 2:1 to about 4:3.

7. The synthetic resin according to claim 4, 5 or 6 wherein the molar ratio of the reaction product of component A and B relative to component C is about 2:1.

8. The synthetic resin according to claim 1, which comprises the reaction product of components A and B further reacted with component C, wherein component C comprises about 5-60% by weight, based on the sum of components A, B and C, of a polyphenol of the following general formula:

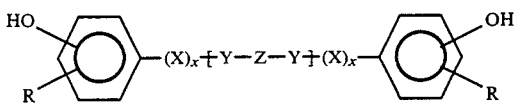

wherein
X=alkylene, arylene, alkarylene, O, O-alkylene, O-arylene, O-alkarylene, S, S-alkylene, S-arylene, S-alkarylene, CO, CO-alkylene, CO-arylene, CO-alkarylene, NH, NH-alkylene, NH-arylene or NH-alkarylene
x=0 or 1

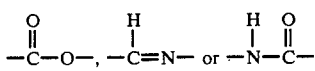

Z=alkylene, or an alkylene radical based on polyesters, polyethers, polyamides, polycarbonates or polyurethanes, R=H, CH$_3$, alkyl, —O—CH$_3$, —O—alkyl,
—NO$_2$, —NR$'_2$, —NR'R" or —NHCOR''', wherein R', R" and R''' constitute straight or branched chain alkyl moieties of 1 to about 6 carbon atoms, the proportion of component C having been selected, as a function of its molecular weight, such that the molar ratio of the reaction product of components A and B relative to component C is about 4:1 to about 0.8:1.

9. The synthetic resin according to claim 1, 4 or 8, comprising the reaction product of said claim reacted further with component D, wherein component D is a primary and/or secondary amine or a salt thereof and/or the salt of a tertiary amine, of a sulfide/acid mixture or of a phosphate/acid mixture.

10. The synthetic resin according to claim 9, which has at least partially been neutralized with an acid and converted into a predominantly aqueous phase.

11. The synthetic resin according to claim 1, 4, 8, 9 or 10, wherein said component B includes, in addition to said reactive hydroxyl group, at least one sterically hindered hydroxyl group which is unreactive toward epoxide groups.

12. The synthetic resin according to claim 1, 4, 8, 9, 10 or 11, wherein components A and B are reacted in the presence of a tertiary amine catalyst.

13. A process for preparing a synthetic resin by modifying a polyepoxide with an alcohol, which comprises reacting:
Component A which is a diepoxide, or a mixture of diepoxides, having an epoxide equivalent weight of less than about 500, at temperatures from about 100° C. to about 180° C. in a solvent free from hydroxyl groups, with
Component B which is an hydroxyl group containing compound, which is reactive with epoxide groups, wherein the molar ratio of component A to component B is about 2:1 to about 7:6, to provide a synthetic resin having terminal epoxide groups and having a mean molecular weight of from about 400 to about 5000.

14. The process according to claim 13 wherein said molar ratio is about 2:1 to about 5:4.

15. The process according to claim 13 wherein said molar ratio is about 2:1 to about 4:3.

16. The process according to claim 13, 14 or 15, wherein the reaction product of component A and B is reacted further with component C, wherein component C comprises about 5-60% by weight, based on the sum of components A, B and C, and component C is a polyhydric alcohol, a polycarboxylic acid, a polyamine or a polysulfide having a molecular weight from about 100 to about 3500, the proportion of component C having been selected, as a function of its molecular weight, such that the molar ratio of the reaction product of components A and B relative to component C is about 4:1 to about 0.8:1.

17. The process according to claim 16 wherein the molar ratio of the reaction product of components A and B relative to component C is about 2:1.

18. The process according to claim 13, 14 or 15, wherein the reaction product of components A and B is reacted further with component C, wherein component C comprises about 5-60% by weight, based on the sum of components A, B and C, of a polyphenol of the following general formula:

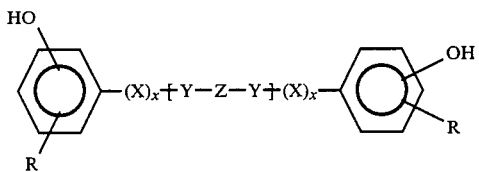

wherein
X=alkylene, arylene, alkarylene, O, O-alkylene, O-arylene, O-alkarylene, S, S-alkylene, S-arylene, S-alkarylene, CO, CO-alkylene, CO-arylene, CO-alkarylene, NH, NH-alkylene, NH-arylene or NH-alkarylene
x=0 or 1

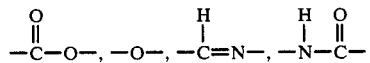

Z=alkylene, or an alkylene radical based on polyesters, polyethers, polyamides, polycarbonates or polyurethanes,
R=H, CH$_3$, alkyl, —O—CH$_3$, —O—alkyl,
—NO$_2$, —NR$'_2$, —NR'R" or —NHCOR''', wherein R', R" and R''' are branched or straight chain alkyl moieties of 1 to about 6 carbon atoms, the proportion of component C having been selected, as a function of its molecular weight, such that the molar ratio of the reaction product from A and B relative to component C is about 4:1 to about 0.8:1.

19. The process according to claim 18 wherein the molar ratio of the reaction product of components A and B relative to component C is about 2:1.

20. A process according to claim 13, 16 or 18, wherein the reaction product of said claim is reacted further with component D which is a primary and/or secondary amine or a salt thereof and/or the salt of a tertiary amine, of a sulfide/acid mixture or of a phosphine/acid mixture.

21. The process according to claim 20, wherein the product is at least partially neutralized with an acid and converted into a predominantly aqueous phase.

22. A process according to claim 13, wherein component B is a compound which contains, in addition to the reactive hydroxyl group, at least one sterically hindered hydroxyl group which is unreactive towards epoxide groups.

23. The process according to claim 13, 16, 18 or 20 wherein said reaction between components A and B is conducted in the presence of a tertiary amine catalyst.

24. A molding, adhesive or binder for a coating composition comprised of the synthetic resin of claim 1, 4 or 8.

25. A molding, adhesive or binder for a coating composition comprised of the synthetic resin of claim 9.

26. A molding, adhesive or binder for a coating composition comprised of the synthetic resin of claim 10.

27. An electrocoating bath for use in a cathodic electrocoating process wherein the binder of said bath is comprised of the resin of claim 9.

28. An electrocoating bath for use in a cathodic electrocoating process wherein the binder of said bath is comprised of the resin of claim 10.

* * * * *